F. WAGNER.
KITCHEN IMPLEMENT.
APPLICATION FILED AUG. 3, 1905.
966,496.
Patented Aug. 9, 1910.
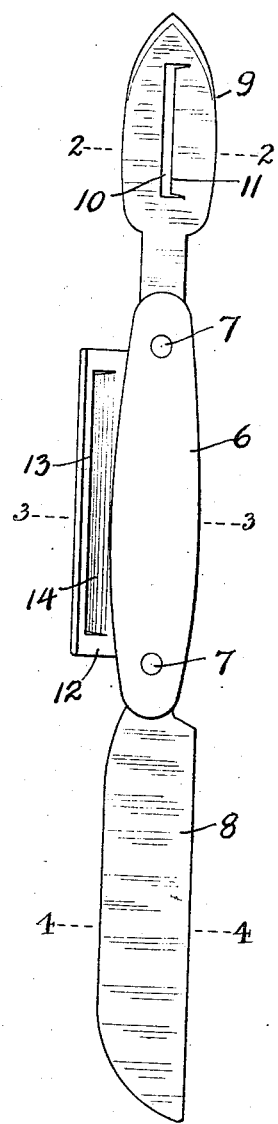
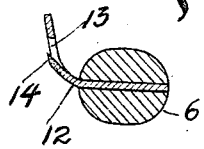
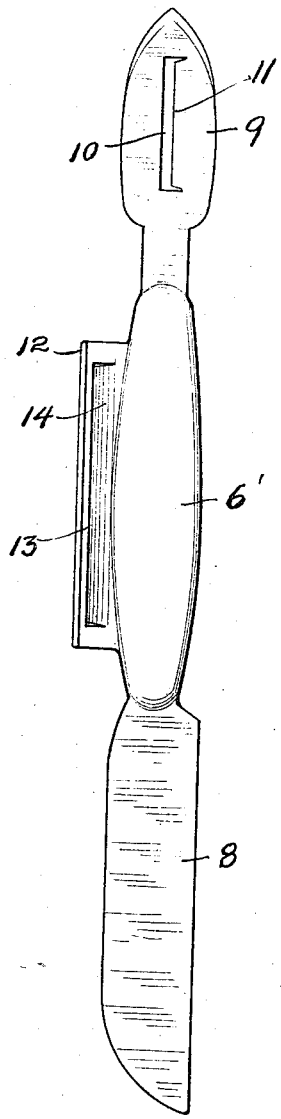
Witnesses.
Inventor.
Frank Wagner
By Benedict & Morsell
Attorneys

UNITED STATES PATENT OFFICE.

FRANK WAGNER, OF MILWAUKEE, WISCONSIN.

KITCHEN IMPLEMENT.

966,496.  Specification of Letters Patent.  Patented Aug. 9, 1910.

Application filed August 3, 1905. Serial No. 272,517.

*To all whom it may concern:*

Be it known that I, FRANK WAGNER, residing in Milwaukee, county of Milwaukee and State of Wisconsin, have invented new and useful Improvements in Kitchen Implements, of which the following is a description, reference being had to the accompanying drawings, which are a part of this specification.

My invention has relation to improvements in kitchen implements.

The primary object of the invention is to provide a convenient, simple, and improved form of implement capable of use for slicing, paring, coring etc.

With the above primary object in view, the invention consists of the device, and its several parts, or the equivalents thereof, as hereinafter more fully claimed.

In the accompanying drawing, Figure 1 is an elevation of the complete equipment; Fig. 2 is a cross section on the line 2—2 of Fig. 1; Fig. 3 is a cross section on the line 3—3 of Fig. 1; Fig. 4 is a cross section on the line 4—4 of Fig. 1; and Fig. 5 is an elevation of a modified form of my invention.

Referring to the form of construction shown in Fig. 1, the numeral 6 indicates a medial handle portion which is preferably of wood, and is shown in Figs. 1 and 3 as consisting of two solid half sections placed face to face, and secured together by means of end rivets 7. The outer surfaces of these sections of the handle are preferably rounded, as shown, for convenience in grasping and holding the handle. The inner end of a knife blade 8 extends between the corresponding ends of the two half sections of the handle, the rivet 7 at said ends passing through the knife blade and thereby securing it to the handle. The knife blade 8 is an ordinary form of blade adapted for paring, cutting, slicing etc. Between the opposite two corresponding ends of the handle sections is secured, by means of the rivet 7 at that end, the inner end of a pointed member 9. This member is provided with a sharpened edge and point, and is also slotted longitudinally, as indicated by the numeral 10. Short cuts are continued laterally from opposite ends of the slot 10 to form a projecting lip 11, said lip being offset from the plane of the under side of the pointed member, and having its edge sharpened. The pointed member 9 is adapted to be thrust into fruit, and when so thrust into the fruit and rotated or twisted around, is adapted to cut out the core. The cutting lip 11 of this member 9 will not only be found useful in slicing small fruit, but furthermore, when the member 9 is inserted into the fruit and then rotated for the purpose of removing the core, the cutting lip in following after the cut made by the longitudinal cutting edge of member 9, will, by reason of its being offset, cut into the walls of the cored out portion to a greater extent than it is possible to do with the sharpened longitudinal edge of the main portion of the member 9, and thereby act to remove or cut out decayed matter. A medial cutter 12 is also provided, consisting of a plate inserted and clamped between the sections of the handle and extending outwardly laterally from one side edge of said handle. The portion of this plate which extends out laterally from the handle is preferably of concavo-convex form in cross section. This laterally projecting portion of the plate is also slotted longitudinally, as indicated by the numeral 13. A lip 14 is formed by cutting the metal inwardly from the ends of the slot 13 for a short distance. The lip so formed is bent outwardly in a direction to offset it from the plane of the bottom of the plate. It will be understood that the longitudinal edge of the plate is not sharpened, but only the longitudinal edge of the lip 14, so that said lip alone constitutes the cutting blade. This cutting blade formed by the lip 14 is advantageously used for the purpose of slicing vegetables, such as potatoes, beets, turnips, carrots, and the like. In the use of this particular cutter of the implement, the handle is held by and between the fingers of the operator (it being understood, of course, that a complete enfolding of the implement in the palm of the hand is unnecessary), and the cutting edge of the lip 14 caused to be drawn over the vegetable to be sliced; or, if preferred, the vegetable itself may be drawn over the cutting edge of said lip.

While, as shown in Figs. 1 and 3, the handle may be composed of two sections, preferably of wood, yet I do not wish to be understood as restricting myself thereto, inasmuch as, if preferred, the said handle and all the cutting mechanisms, or the said handle and the cutting member 8, or the said handle and the cutting member 12, or the said handle and the cutting members 8 and 12 or the said handle with the knife blade in connection with the member 9, or in connection with the member 12, may be formed of one piece of steel, as for instance, sheet steel bent and shaped to form the handle and the cutters referred to; or the handle and all of the cutters, or only some of the cutters as above indicated, may be cast complete. I have, in Fig. 5, shown the complete device in one casting, the several parts in this figure being designated by the same reference numerals as applied to corresponding parts in the other figures, with the exception of the handle which, in Fig. 5, is designated by the numeral 6'.

What I claim as my invention is:

A kitchen knife, comprising a handle portion formed in two sections connected together, a blade portion interposed between the handle sections and provided with a projecting angular lip having a sharpened outer edge, and a guard portion extending at an angle from the blade portion and provided with a longitudinal slot extending in front of the edge of the blade and parallel with relation thereto.

In testimony whereof, I affix my signature, in presence of two witnesses.

FRANK WAGNER.

Witnesses:
A. L. MORSELL,
ANNA F. SCHMIDTBAUER.